2,548,636

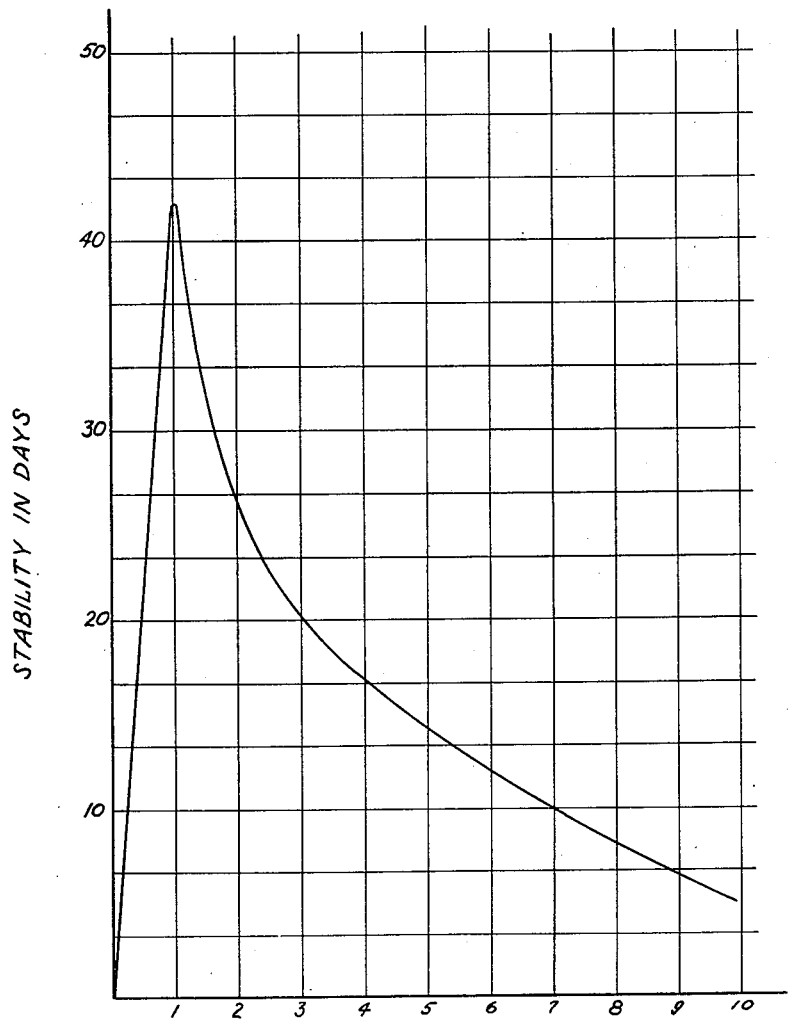
% HYDROQUINONE BY WEIGHT OF AMMONIUM HYDROXIDE
Inventor
CLARK E. THORP Patented Apr. 10, 1951

UNITED STATES PATENT OFFICE 2,548,636

STABILIZED CUPRAMMONIUM HYDROXIDE SOLUTION AND METHOD OF PREPARING THE SAME

Clark E. Thorp, Chicago, Ill., assignor to Hawley Products Company, St. Charles, Ill., a corporation of Delaware Application May 29, 1946, Serial No. 673,139

11 Claims. (Cl. 23—55)

This invention relates to stabilized cuprammonium solutions and methods of preparing such solutions.

Conventional cuprammonium hydroxide solutions are unstable to air, so that they cannot, for instance, be applied to cellulose (for dissolving or plasticizing the same), by means of a standard air spray gun. Further, an ordinary cuprammonium hydroxide solution, after a few days of storage, will gradually liberate copper hydroxide and rapidly lose its power of dissolving or plasticizing cellulose. It should also be noted that ordinary cuprammonium hydroxide solutions are not stable to heat, aeration, or dilution.

To render cuprammonium hydroxide solution more stable, it has been suggested to incorporate with such solution substances such as an alkylene oxide, ethylene glycol, glycerine, hexitols, or reducing sugars such as glucose. Such additions render cuprammonium solutions sufficiently stable to allow spraying, but not sufficiently stable for storage. Reducing sugars also diminish the dissolving power for cellulose of cuprammonium hydroxide solutions.

I have now found that an ordinary cuprammonium hydroxide solution can be stabilized satisfactorily for use in dissolving or plasticizing cellulose by incorporation with the cuprammonium solution of ethylene diamine, hydroquinone, resorcinol, or methylaminophenol. The cuprammonium hydroxide solution stabilized with one of these addition agents will retain its dissolving powers after more than three months of storage. Such stabilized solutions are further stable to heat, aeration, and dilution, and can be applied to cellulose by spraying.

It should be noted that other photographic developers, reducing agents, and polyhydroxy benzenes than those disclosed hereinabove are not effective stabilizers. For instance, formaldehyde decomposes cuprammonium solution on contact, while reducing sugars have little or no stabilizing effect. Parahydroxy methyl aniline hydrosulfate ("Metol") and paraphenylene-diamine render cuprammonium hydroxide solution stable for only three days. Parahydroxy phenyl glycine stabilizes a cuprammonium solution for only five days. Phloroglucinol and gallic acid stabilize a cuprammonium hydroxide solution only for three days while pyrocatechol, although stabilizing a cuprammonium solution for ten days, yields a cellulose dispersion which, when dried, has unsatisfactory properties. Nordihydroguairaretic acid in a concentration of 0.05% precipitates copper salts almost immediately.

It is, therefore, an important object of the present invention to provide a stabilized cuprammonium hydroxide solution and, more particularly, a cuprammonium hydroxide solution stabilized by incorporation therein of hydroquinone, resorcinol, para methylaminophenol, or ethylene diamine.

Another important object of the present invention is to provide methods for the preparation of such stabilized cuprammonium hydroxide solutions.

Other and further objects and features of the present invention will become apparent from the following description and appended claims.

The attached drawing is a graph illustrating the stability of a cuprammonium hydroxide solution when 1 to 10% hydroquinone by weight of ammonium hydroxide is present in the solution.

In proceeding according to the present invention, a cuprammonium hydroxide solution is prepared by passing air over copper in the presence of ammonium hydroxide. Copper oxide is formed and is immediately dissolved in the ammonia to form a copper ammonium complex. For the convenient preparation of a small amount of cuprammonium hydroxide solution, a glass tube may be packed with about seventy-five grams of light copper turnings.

The hydroquinone or other stabilizing agent should be incorporated with the copper turnings before or at the time the same are placed in the tube. The copper turnings in the tube are then covered with 700 cubic centimeters of ammonium hydroxide having a specific gravity of 0.9. Air is bubbled slowly through the tube. In the case of a relatively small tube containing the above mentioned amounts of copper turnings, the bubbling of air is continued for at least three hours. The rate of formation of cuprammonium hydroxide is inversely proportional to the temperature. To speed up the reaction and to maintain uniform conditions with resultant formation of equivalent solutions, the tube containing the copper turnings and the ammonia may be provided with a jacket through which cooling water is passed. The cuprammonium hydroxide solution thus obtained is drawn off from the residual, unattacked copper and placed in colored glass bottles for future use. Air bubbling may be continued for longer than three hours, but the slight gain in dissolving power of the thus prepared solution hardly justifies such prolongation of the bubbling. Only about one-third of the copper initially placed in the tube is consumed within the time indicated. Therefore, in subsequent runs, only about one-third of the copper need be replaced by additional copper.

In the preparation of greater amounts of cuprammonium hydroxide solutions in larger reaction vessels, the initial charge of ammonium hydroxide may amount to from eight to ten pounds. Such larger generation units require only one hour of air bubbling with a resultant smaller loss of ammonium vapor. Likewise, when the final specific gravity is controlled to run from about 0.94 to 0.97, there is a reduction in the consumption of copper.

The cuprammonium solutions produced should have sufficient but need not have excessive dissolving power. If excessively strong, the solutions may be diluted before application. The dissolving power can be measured by the test described hereinbelow. Cuprammonium solutions containing 30 grams copper and 165 grams of ammonia per liter prepared as disclosed hereinabove in the smaller containers have been found satisfactory. In the preparation of larger batches (as described hereinabove), I have obtained satisfactory dissolving power from cuprammonium solutions containing 50 grams copper and 200 grams ammonia per liter.

The air bubbled through the ammonia should preferably be free of carbon dioxide. To remove carbon dioxide, the air may be bubbled through a solution of barium hydroxide.

The amount of hydroquinone required to effect satisfactory stability of the cuprammonium hydroxide solution will vary between about 0.3 and 2% of hydroquinone by weight of the ammonium hydroxide used. Solutions containing 1% hydroquinone still dissolve cellulose after one and one-half months' storage in amber bottles with air over the liquid. Maximum gloss and film hardness were obtained with solutions containing from 1 to 2% of hydroquinone. At hydroquinone concentrations below 0.3%, the degree of stability was not so satisfactory as at higher concentrations. Solutions containing only 0.05% hydroquinone were found to be only slightly better than solutions made without hydroquinone, in which copper hydroxide begins to precipitate immediately and which lose their solvent power completely within two days of preparation. In solutions containing over 2% of hydroquinone, precipitation of a considerable amount of a black solid started soon after the preparation of the solution. Such solutions also had a rather low solvent power for cellulose.

When paramethylaminophenol (preferably in the form of the sulfate), resorcinol or ethylene diamine are used as stabilizers, the same are incorporated into the cuprammonium solution in a similar manner and in amounts required to give an equivalent stabilizing effect to that already described in the case of hydroquinone.

The relative strength of various cuprammonium hydroxide solutions with respect to dissolving power may be determined by means of a "dilution number test." The dilution number is that concentration of the diluted cellulose solvent expressed in percent of total volume at which solution of cellulose is first discernible. To carry out this test, a number 604 S & S 7 cm. or other suitable filter paper is immersed, dry, in 50 ml. total solution for 30 seconds. A Petri dish makes a good container for the solution in this test. Water containing five percent by volume of concentrated ammonium hydroxide is used for diluting the cellulose solvent. A dilution number of 25, for instance, is obtained when 12.5 ml. of cellulose solvent diluted with 37.5 ml. of water containing ammonia will just begin to dissolve the fibers of the filter paper. Initial dissolution of the fibers can be readily detected within limits of two dilution units. Thus, in the foregoing example, 23 percent by volume of cellulose solvent would not yet have affected the fibers of the filter paper and 27 percent by volume of cellulose solvent would have dissolved the fibers very appreciably. It is evident from the above that the smaller dilution numbers indicate the better solvents.

Cuprammonium hydroxide solutions prepared as described hereinabove and containing, as stabilizers, respectively, 1 percent of hydroquinone and 1 percent of resorcinol, are characterized, respectively, by dilution numbers of 30 and 32.5. A cuprammonium hydroxide solution stabilized by 6 percent (by weight of the ammonium hydroxide) of ethylene diamine has a dilution number of 20. This last mentioned solution is also characterized by great heat stability. In fact, the solvent power increases with increasing temperatures up to 140° F. The solvent power then remains constant up to 160° F. before beginning to diminish. The solution maintains its solvent power after three months storage in an amber bottle.

It will thus be seen that I have provided stable cuprammonium hydroxide solutions effective as solvents or plasticizers for cellulose, and adapted for use whenever cellulose dispersions are to be prepared, as in the preparation of regenerative cellulose in the form of sheets or strands, or in the surface treatment of articles made up of cellulosic material.

Many details of composition and method may be varied within a wide range without departing from the principles of this invention and without sacrificing the advantages disclosed hereinabove, and it is, therefore, not my purpose to limit the patent granted on this invention otherwise than necessitated by the scope of the appended claims.

I claim as my invention:

1. A stable cuprammonium hydroxide solution comprising, as a stabilizing agent, from .05% to 2.0% by weight of the ammonium hydroxide present of a substance selected from the class consisting of hydroquinone, resorcinol and paramethylaminophenol.

2. A stable cuprammonium hydroxide solution containing from about 0.3 to about 2% hydroquinone by weight of the ammonium hydroxide present.

3. A stable cuprammonium hydroxide solution containing from about 1 to about 2% hydroquinone by weight of the ammonium hydroxide present.

4. A method of stabilizing a cuprammonium hydroxide solution comprising incorporating therewith from .05% to 2.0% by weight of the ammonium hydroxide present of a substance selected from the class consisting of hydroquinone, resorcinol and paramethylaminophenol.

5. A method of preparing a stable cuprammonium hydroxide solution which comprises incorporating with comminuted copper from .05% to 2.0% by weight of the ammonium hydroxide present of a substance selected from the class consisting of hydroquinone, resorcinol and paramethylaminophenol, covering the resulting mixture with ammonium hydroxide, and bubbling air through said aqueous ammonium hydroxide.

6. A method of stabilizing a cuprammonium hydroxide solution which comprises incorporating therewith from about 0.3 to about 2% hydroquinone by weight of the ammonium hydroxide present.

7. A method of stabilizing a cuprammonium hydroxide solution which comprises incorporating therewith from about 1 to about 2% of hydroquinone by weight of the ammonium hydroxide present.

8. A stable cuprammonium hydroxide solution containing from about 0.3% to about 2% resorcinol by weight of the ammonium hydroxide present.

9. A method of stabilizing a cuprammonium hydroxide solution which comprises incorporating therewith from about 0.3% to about 2% resorcinol by weight of the ammonium hydroxide present.

10. A stable suprammonium hydroxide solution containing from about 0.3% to about 2% para-methylaminophenol by weight of the ammonium hydroxide present.

11. A method of stabilizing a cuprammonium hydroxide solution which comprises incorporating therewith from about 0.3% to about 2% para-methylaminophenol by weight of the ammonium hydroxide present.

CLARK E. THORP.

REFERENCES CITED

The following references are of record in the file of this patent:

UNITED STATES PATENTS

| Number | Name | Date |
| --- | --- | --- |
| 658,632 | Fremery et al. | Sept. 25, 1900 |
| 954,984 | Mertz | Apr. 12, 1910 |
| 965,273 | Bernstein | July 26, 1910 |
| 1,064,260 | Traube | June 10, 1913 |
| 1,720,992 | Barett | July 16, 1929 |
| 1,805,194 | Strickhouser | May 12, 1931 |
| 1,995,063 | Harris et al. | Mar. 19, 1935 |
| 2,008,680 | Carlisle et al. | July 23, 1935 |
| 2,350,985 | Brown | June 13, 1944 |

FOREIGN PATENTS

| Number | Country | Date |
| --- | --- | --- |
| 252,661 | Germany | Oct. 23, 1912 |